(12) United States Patent
Shibata et al.

(10) Patent No.: US 7,272,856 B2
(45) Date of Patent: Sep. 18, 2007

(54) DECRYPTION DEVICE

(75) Inventors: Osamu Shibata, Osaka (JP); Taihei Yugawa, Nara (JP); Tsutomu Sekibe, Osaka (JP); Yoshiyuki Saito, Osaka (JP); Toshihiko Otake, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 810 days.

(21) Appl. No.: 09/829,763

(22) Filed: Apr. 10, 2001

(65) Prior Publication Data

US 2001/0034715 A1     Oct. 25, 2001

(30) Foreign Application Priority Data

Apr. 12, 2000    (JP) .............................. 2000-110260

(51) Int. Cl.
*G06F 7/04*      (2006.01)
*H04N 7/167*    (2006.01)

(52) U.S. Cl. ............................. 726/26; 726/27; 726/29; 380/201

(58) Field of Classification Search ........ 380/200–201, 380/203, 277; 713/189, 193–194
See application file for complete search history.

(56) References Cited

U.S. PATENT DOCUMENTS

| 5,452,357 | A | * | 9/1995 | Naccache ................... 713/172 |
| 5,923,754 | A | * | 7/1999 | Angelo et al. ................. 705/54 |
| 6,009,174 | A | * | 12/1999 | Tatebayashi et al. ........ 380/277 |
| 6,160,890 | A | * | 12/2000 | Tatebayashi et al. ........ 380/277 |
| 6,496,928 | B1 | * | 12/2002 | Deo et al. .................... 713/153 |
| 6,801,999 | B1 | * | 10/2004 | Venkatesan et al. ........ 713/167 |
| 2002/0016919 | A1 | * | 2/2002 | Sims, III ..................... 713/193 |

FOREIGN PATENT DOCUMENTS

JP          07-131449        5/1995

OTHER PUBLICATIONS

"Copy Protection for DVD Video", Bloom, et al., Proceedings of the IEEE, vol. 87, No. 7, Jul. 1999, pp. 1267-1276.

* cited by examiner

*Primary Examiner*—Kim Vu
*Assistant Examiner*—Ponnoreay Pich
(74) *Attorney, Agent, or Firm*—Snell & Wilmer L.L.P.

(57) ABSTRACT

A decryption device includes: an internal-key storage section for storing an internal-key; a content-key storage section for storing a content-key; a determination section for determining whether or not a value of the content-key storage section in its initial state and a current value of the content-key storage section are different; and an operation section, the operation section including a first decrypting section which, when an encrypted content-key is input to the operation section, decrypts the encrypted content-key using the internal-key so as to obtain a content-key and stores the content-key in the content-key storage section, and a second decrypting section which, when an encrypted content is input to the operation section and the determination section determines that the value of the content-key storage section in its initial state and the current value of the content-key storage section are different, decrypts the encrypted content using the current value of the content-key storage section as a content-key so as to obtain a first output data and outputs the first output data to outside of the decryption device.

7 Claims, 7 Drawing Sheets

DECRYPTION DEVICE

BACKGROUND OF THE INVENTION

1. Field of the Invention

The present invention relates to a decryption device and an encryption/decryption device for encrypting/decrypting digital contents, such as music, image, video, game, etc.

2. Description of the Related Art

In recent years, along with the propagation of digital contents, such as music, image, video, game, etc., preventing fraudulent acts on such digital contents has been becoming more important for protecting rights of a copyright owner, and a profit of a distributor, of such digital contents. The fraudulent acts include, for example, fraudulent obtainment of digital contents by means of interception of communications, eavesdropping, pretending to be an authorized person, etc., and making an illegal copy from and illegal alteration to data received and stored in a recording medium. In order to prevent these fraudulent acts, copyright protection techniques, such as encryption/authentication for determining whether or not it is an authorized system or for data scrambling, are required.

In recent years, copyright protection techniques have been provided in various consumer products. In general, a reproduction/recording apparatus for digital contents achieves encrypting/decrypting processing using an encryption/decryption device for performing encrypting/decrypting operations and a master control device for controlling the encryption/decryption device.

As described in the following, in the reproduction/recording apparatus, reproduction processing is performed using an encrypted content and an encrypted key (encrypted content-key) for decrypting the encrypted content.

In the first step, the master control device of the reproduction/recording apparatus reads data from a memory device (storage medium) storing encrypted contents and encrypted content-keys. An encrypted content-key read from the master control device is input to an encryption/decryption device. The encryption/decryption device decrypts this encrypted content-key using an internal-key, thereby obtaining a content-key. Then, the master control device inputs an encrypted content read from the memory device to the encryption/decryption device. The encryption/decryption device decrypts the encrypted content using the obtained content-key and outputs the decrypted content to the master control device. In this way, the reproduction processing for the encrypted content is performed.

Furthermore, in the reproduction/recording apparatus, recording processing is performed as follows.

In the first step, the master control device issues a content-key generation instruction to the encryption/decryption device, whereby a content-key used for encrypting a content is generated inside the encryption/decryption device. The encryption/decryption device encrypts the content-key using the internal-key so as to obtain an encrypted content-key, and outputs the encrypted content-key to the master control device. Then, the master control device inputs a content to the encryption/decryption device. The encryption/decryption device encrypts the content and outputs the encrypted content to the master control device. Thereafter, the master control device transfers the encrypted content and its encrypted content key to the memory device, whereby the recording processing is performed.

The encryption/decryption device operates in response to commands from the master control device. In the reproduction/recording apparatus, when the master control device is not tamper-resistant, the encryption/decryption device may be fraudulently operated. For example, it is possible to give the encryption/decryption device a command to encrypt or decrypt a content without providing a content-key in the encryption/decryption device.

In a conventional encryption/decryption device, in the case of encrypting a content or decrypting an encrypted content, encrypting or decrypting processing is initiated based on only a command supplied from outside. Therefore, when the encryption/decryption device receives a command to encrypt a content or decrypt an encrypted content without providing a content-key in the encryption/decryption device, the encryption/decryption device erroneously recognizes a value of a memory region in the encryption/decryption device, which is provided for storing a content-key, as a content-key, and this value is used as a content-key to encrypt a content or decrypt an encrypted content.

Such a value of the memory region is believed to be always the same when the encryption/decryption device is in the initial state e.g., immediately after the encryption/decryption device is powered-on. Furthermore, encryption/decryption devices produced based on the same standard operate in a similar manner. In the present specification, the value of the memory region in the encryption/decryption device, which is provided for storing a content-key when the encryption/decryption device is in the initial state, e.g., immediately after the encryption/decryption device is powered-on, is referred to as an "initial content-key".

By fraudulently operating the encryption/decryption device, it is possible to encrypt a content or decrypt an encrypted content using the initial content-key. A typical example of fraudulent acts achieved by such a fraudulent operation is now described in the following steps ①, ②, and ③:

① A correlation between input data to and output data from the decryption device which decrypts an encrypted content using an initial content-key is examined. The output data is a result of decrypting the input data using the initial content-key. A correlation is examined for a number of pairs of input data and output data, whereby the initial content-key and an algorithm for decrypting processing are deciphered.

② When the initial content-key and the algorithm for decrypting processing are deciphered at step ①, an encryption device which encrypts any content using the initial content-key can be fraudulently achieved. With such a fraudulent encryption device, it is possible to encrypt a content using the initial content-key and produce a fraudulent medium in which the encrypted content is recorded.

Alternatively, with the encryption device which performs encryption with the initial content-key, step ② can be achieved without step ①.

③ Data in the fraudulent medium produced at step ② can be fraudulently decrypted by a decryption device which decrypts an encrypted content using the initial content-key. Such a decryption device which can fraudulently decrypt an encrypted content is not limited to the decryption device used in step ①. Any decryption device may be used so long as it has the same initial content-key as that of the decryption device used in step ①. Furthermore, the decryption device does not need to be the same as the decryption device used in step ②. Therefore, such a fraudulent act can widely propagate without being limited within a single encryption/decryption device.

Thus, in the conventional encryption/decryption device, when the encryption/decryption device is fraudulently operated such that a content is encrypted or an encrypted content is decrypted using the initial content-key, there is a possibility that the security of the encryption/decryption device may be deteriorated.

SUMMARY OF THE INVENTION

According to one aspect of the present invention, a decryption device includes: an internal-key storage section for storing an internal-key; a content-key storage section for storing a content-key; a determination section for determining whether or not a value of the content-key storage section in its initial state and a current value of the content-key storage section are different; and an operation section, the operation section including a first decrypting section which, when an encrypted content-key is input to the operation section, decrypts the encrypted content-key using the internal-key so as to obtain a content-key and stores the content-key in the content-key storage section, and a second decrypting section which, when an encrypted content is input to the operation section and the determination section determines that the value of the content-key storage section in its initial state and the current value of the content-key storage section are different, decrypts the encrypted content using the current value of the content-key storage section as a content-key so as to obtain a first output data and outputs the first output data to outside of the decryption device.

In one embodiment of the present invention, the decryption device further includes a content-key generation section which generates a content-key for encrypting a content based on random numbers and stores the generated content-key in the content-key storage section, wherein the operation section further includes a first encrypting section which encrypts the content-key for encrypting a content so as to obtain an encrypted content-key and outputs the encrypted content-key to outside of the decryption device, and a second encrypting section which, when a content is input to the operation section and the determination section determines that the value of the content-key storage section in its initial state and the current value of the content-key storage section are different, encrypts the content using the current value of the content-key storage section as a content-key so as to obtain a second output data and outputs the second output data to outside of the decryption device.

In another embodiment of the present invention, the decryption device further includes a mutual authentication section for determining whether or not a mutual authentication has been made between the mutual authentication section and a storage device which is located outside the decryption device and stores the encrypted content-key, wherein the second decrypting section decrypts the encrypted content when the mutual authentication section determines that the mutual authentication has been made.

In still another embodiment of the present invention, the internal-key storage section stores a plurality of internal-keys; and the internal-key storage section selects one of the plurality of internal-keys as the internal-key based on internal-key selection information input from outside the decryption device to the decryption device.

Now, functions of the present invention are described.

A decryption device according to the present invention has a determination section for determining whether or not a value of a content-key storage section in its initial state and a current value of the content-key storage section are different. When an encrypted content is input to an operation section, and a value of the content-key storage section in its initial state and the determination section determines that a current value of the content-key storage section are different, a second decrypting section included in the operation section performs decrypting processing for the encrypted content. With such an arrangement, the decrypting processing for the encrypted content is prevented from being performed while the value of the content-key storage section is in the initial state. That is, the decrypting processing for the encrypted content is prevented from being performed using an initial content-key. Thus, the security of the decryption device is improved.

When a decryption device according to the present invention further includes a second encrypting section, the decryption device functions as an encryption/decryption device. When a content is input to an operation section, and a determination section determines that a value of the content-key storage section in its initial state and a current value of the content-key storage section are different, the second encrypting section encrypts the content using the current value of the content-key storage section as a content-key so as to obtain a second output data, and outputs the first output data to outside of the encryption/decryption device. With such an arrangement, the encrypting processing for the content is prevented from being performed while the value of the content-key storage section is in the initial state. That is, the encrypting processing for the content is prevented from being performed using an initial content-key. Thus, the security of the encryption/decryption device is improved.

Thus, the invention described herein makes possible the advantage of providing an encryption/decryption device with improved security that can prevent a fraudulent operation in which a content is encrypted or an encrypted content is decrypted using the initial content-key.

This and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the drawings. In the present specification, a "decryption device" is a device which has a function for decrypting encrypted data (decrypting function); and an "encryption/decryption device" is a device which has both the decrypting function and a function for encrypting data (encryption function). Thus, in the present specification, a concept of decryption devices includes encryption/decryption devices.

Embodiment 1

Figure 1:
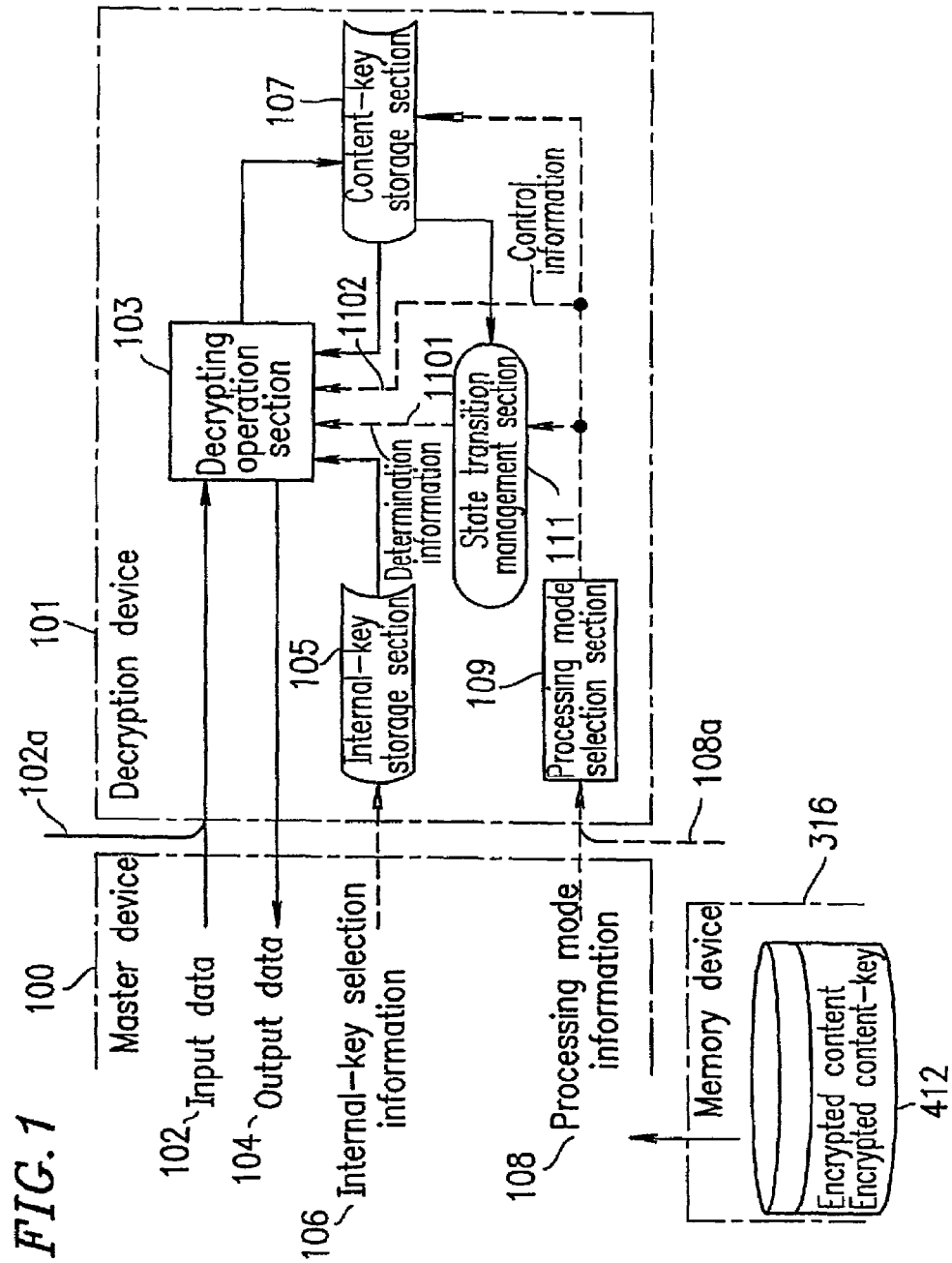
FIG. 1 is a block diagram showing a structure of a decryption device 101 according to embodiment 1 of the present invention.

FIG. 1 shows a structure of a decryption device 101 according to embodiment 1 of the present invention. The decryption device 101 decrypts input data 102 based on information from a master device 100 which acts as a host (the input data 102, internal-key selection information 106, and processing mode information 108).

The decryption device 101 is used with the master device 100, and is mounted on a reproduction/recording apparatus (not shown). The master device 100 has a function for reading encrypted contents and encrypted content-keys from a predetermined region 412 in a memory device 316.

The memory device 316 may be any recording medium. In the illustrated embodiment, the memory device 316 is a semiconductor storage medium.

The decryption device 101 includes an internal-key storage section 105, a state transition management section 111, a processing mode selection section 109, a decrypting operation section 103, and a content-key storage section 107.

The internal-key storage section 105 stores an internal-key inherent to the decryption device 101. The internal-key storage section 105 is provided in a region of the decryption device 101 which is inaccessible from outside. The internal-key storage section 105 stores the internal-key inherent to the decryption device 101 in a hard-wired manner, or in a ROM or a non-volatile memory. The internal-key storage section 105 may store a plurality of internal-keys. In the case where the internal-key storage section 105 stores a plurality of internal-keys, one of the plurality of internal-keys is selected based on the internal-key selection information 106 input from the master device 100.

The content-key storage section 107 stores content-keys for decrypting encrypted contents.

The state transition management section 111 determines whether or not a content-key (a content-key for decrypting encrypted contents) is stored in the content-key storage section 107. In particular, the state transition management section 111 functions as a determination section for determining whether or not a value of the content-key storage section 107 in its initial state and a current value of the content-key storage section 107 are different. When the current value of the content-key storage section 107 is the same as the value of the content-key storage section 107 in its initial state, the content-key storage section 107 does not include any content-key, i.e., the state transition management section 111 determines that the value of the content-key storage section 107 is an initial content-key. The state transition management section 111 transmits to the decrypting operation section 103 determination information 1101 which indicates whether or not the value of the content-key storage section 107 in its initial state and a current value of the content-key storage section 107 are different.

The processing mode selection section 109 interprets the processing mode information 108 input from the master device 100. The processing mode information 108 is a command supplied from the master device 100 to the decryption device 101. The decryption device 101 performs two types of decrypting processing, i.e., decrypting processing for an encrypted content-key and decrypting processing for an encrypted content. Thus, the processing mode information 108 supplied as a command from the master device 100 to the decryption device 101 indicates which decrypting processing should be performed by the decryption device 101. The processing mode selection section 109 outputs control information 1102 to the decrypting operation section 103 based on the result of the interpretation of the processing mode information 108.

In this way, the processing mode selection section 109 interprets the processing mode information 108 and controls the decrypting operation section 103 based on the result of the interpretation. However, when the decrypting operation section 103 is directly controlled by the processing mode information 108 supplied from the master device 100, the processing mode selection section 109 can be omitted.

The decrypting operation section (operation section) 103 performs two types of decrypting processing, i.e., decrypting processing for an encrypted content-key and decrypting processing for an encrypted content.

Figure 2:
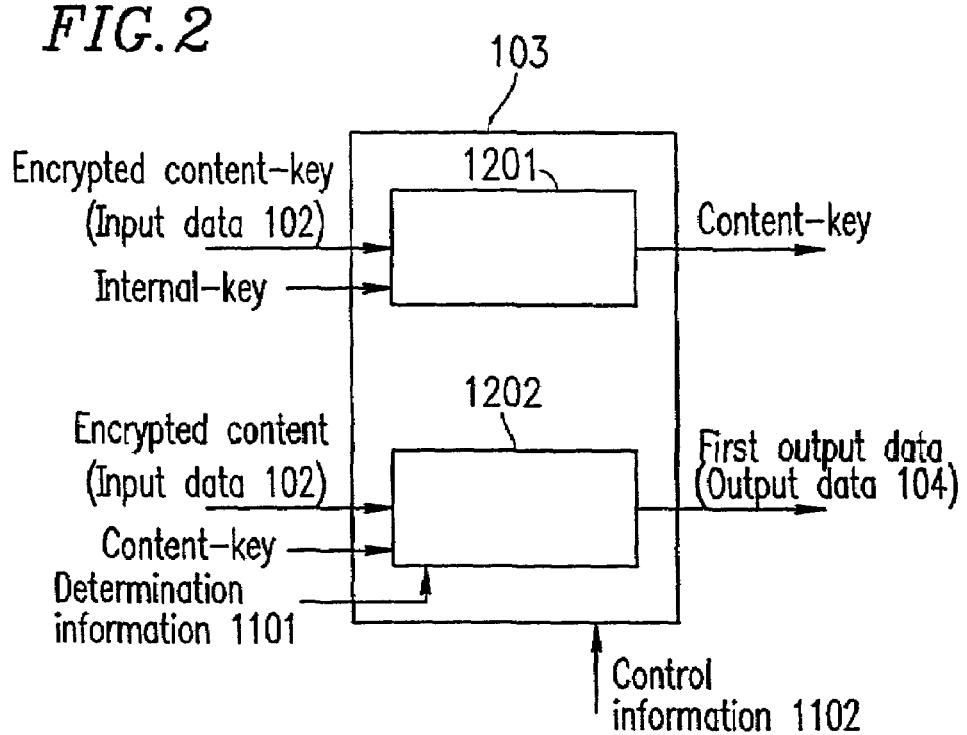
FIG. 2 is a block diagram showing an exemplary internal structure of the decrypting operation section 103.

FIG. 2 schematically shows an exemplary internal structure of the decrypting operation section 103.

The decrypting operation section 103 includes a first decrypting section 1201 for decrypting an encrypted content-key and a second decrypting section 1202 for decrypting an encrypted content.

The first decrypting section 1201 is activated when the processing mode information 108 from the master device 100 (FIG. 1) indicates the decrypting processing for an encrypted content-key. When an encrypted content-key is input as input data 102 from the master device 100 to the first decrypting section 1201, the first decrypting section 1201 decrypts the encrypted content-key using an internal-key stored in the internal-key storage section 105. The decrypted data is stored as a content-key in the content-key storage section 107.

The second decrypting section 1202 is activated when the processing mode information 108 from the master device 100 (FIG. 1) indicates the decrypting processing for an encrypted content. When an encrypted content (data including encrypted digital content such as music, image, video, game, etc.) is input as input data 102 from the master device 100 to the second decrypting section 1202, and the determination information 1101 output from the state transition management section 111 indicates that "the value of the content-key storage section 107 in its initial state and a current value of the content-key storage section 107 are different", the second decrypting section 1202 decrypts the encrypted content using the value of the content-key storage section 107 as a content-key. The decrypted data (first output data) is output to the master device 100 as output data 104. In this example, the first output data is a content obtained by decrypting the encrypted content.

In this way, the second decrypting section 1202 performs the decrypting processing for an encrypted content after it has been confirmed that "the value of the content-key storage section 107 in its initial state and a current value of the content-key storage section 107 are different". With such an arrangement, even when the master device 100 is not tamper-resistant (hence, even when fraudulent input data and processing mode information are input to the decryption device 101 through fraudulent routes 102a and 108a), the decrypting processing for an encrypted content is prevented from being performed while the content-key storage section 107 is in the initial state. That is, the decrypting processing for an encrypted content is prevented from being performed using an initial content-key. Thus, steps ① and ③ in the above-described typical example of fraudulent acts are prevented from being performed and, accordingly, a decryption device with improved security is achieved.

The decryption device 101 may be, for example, an ASIC (Application Specified IC). The master device 100 may be, for example, an MPU (Microprocessor Unit). Thus, the decryption device 101 may be produced as a single semiconductor package.

Any encryption/decryption algorithm may be employed for the decrypting processing performed in the first decrypting section 1201 and the second decrypting section 1202 of the decrypting operation section 103. For example, the DES (Data Encryption Standard) may be employed. Furthermore, the length of an internal-key and a content-key may be any bit. For example, it may be 56 bits.

The internal structure of the decrypting operation section 103 is not limited to the internal structure shown in FIG. 2. The first decrypting section 1201 and the second decrypting section 1202 may have the same structure. Thus, the first decrypting section 1201 and the second decrypting section 1202 may be provided as a single decrypting section.

Figure 3:
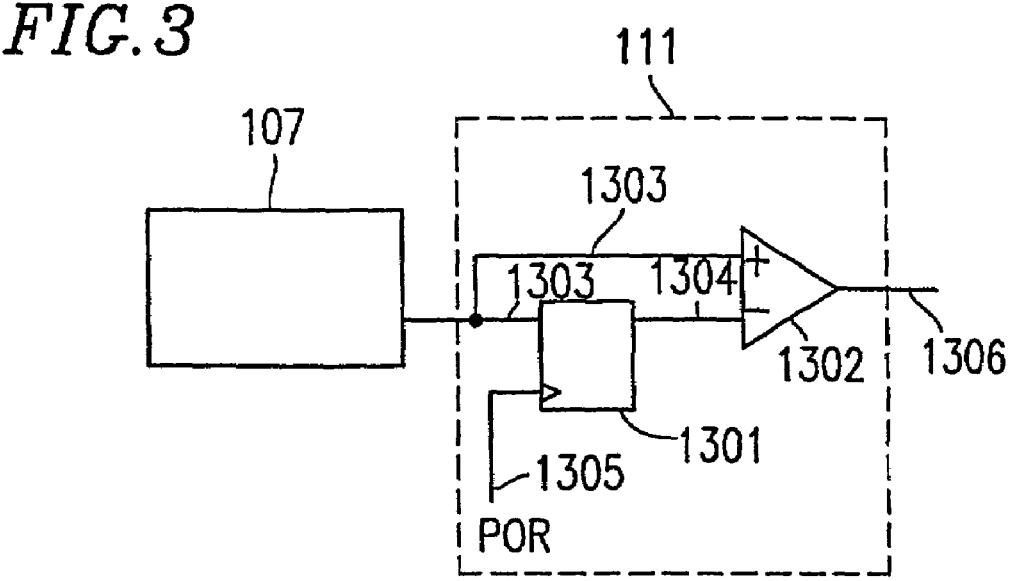
FIG. 3 shows an exemplary internal structure of the state transition management section 111 of FIG. 1.

FIG. 3 shows an exemplary internal structure of the state transition management section 111 of FIG. 1. The state transition management section 111 is connected to the content-key storage section 107. The state transition management section 111 includes a register 1301 and a comparator 1302. The register 1301 holds the value of an input 1303 (the value of the content-key storage section 107) at the time when a pulse signal is input to a latch input 1305. The comparator 1302 compares an output 1304 of the register 1301 and the input 1303 (the value of the content-key storage section 107) so as to output a comparison result 1306. The comparison result 1306 is input to the decrypting operation section 103 (FIG. 1) as the determination information 1101.

The latch input 1305 of the register 1301 receives a POR (Power On Reset) signal. The POR signal is a signal which pulses only once immediately after power-on. A power supply used for the power-on may be, for example, a power supply for the decryption device 101 or a power supply for a reproduction/recording apparatus (not shown) on which the decryption device 101 is mounted. After the power-on, a value of the content-key storage section 107 immediately after the power-on is held in the register 1301. Accordingly, the comparator 1302 compares the value of the content-key storage section 107 immediately after the power-on and a current value of the content-key storage section 107. When these values are equal, the output (comparison result) 1306 of the comparator 1302 is "0"; otherwise, the output 1306 of the comparator 1302 is non-zero.

In this way, the state transition management section 111 can determine whether or not the value of the content-key storage section 107 in its initial state and a current value of the content-key storage section 107 are different. In the above example, the initial state is a state immediately after the power-on, but according to the present invention, the initial state is not limited thereto. For example, the initial state may be a state immediately after the whole decryption device 101 is reset. A pulse signal is input to the latch input 1305 of the state transition management section 111 immediately after any initial state, whereby the state transition management section 111 can determine whether or not the value of the content-key storage section 107 in its initial state and a current value of the content-key storage section 107 are different.

The structure of the state transition management section 111 is not limited to the structure shown in FIG. 3. The state transition management section 111 may have any structure so long as it has a function for determining whether or not the value of the content-key storage section 107 in its initial state and a current value of the content-key storage section 107 are different.

Embodiment 2

Figure 4:
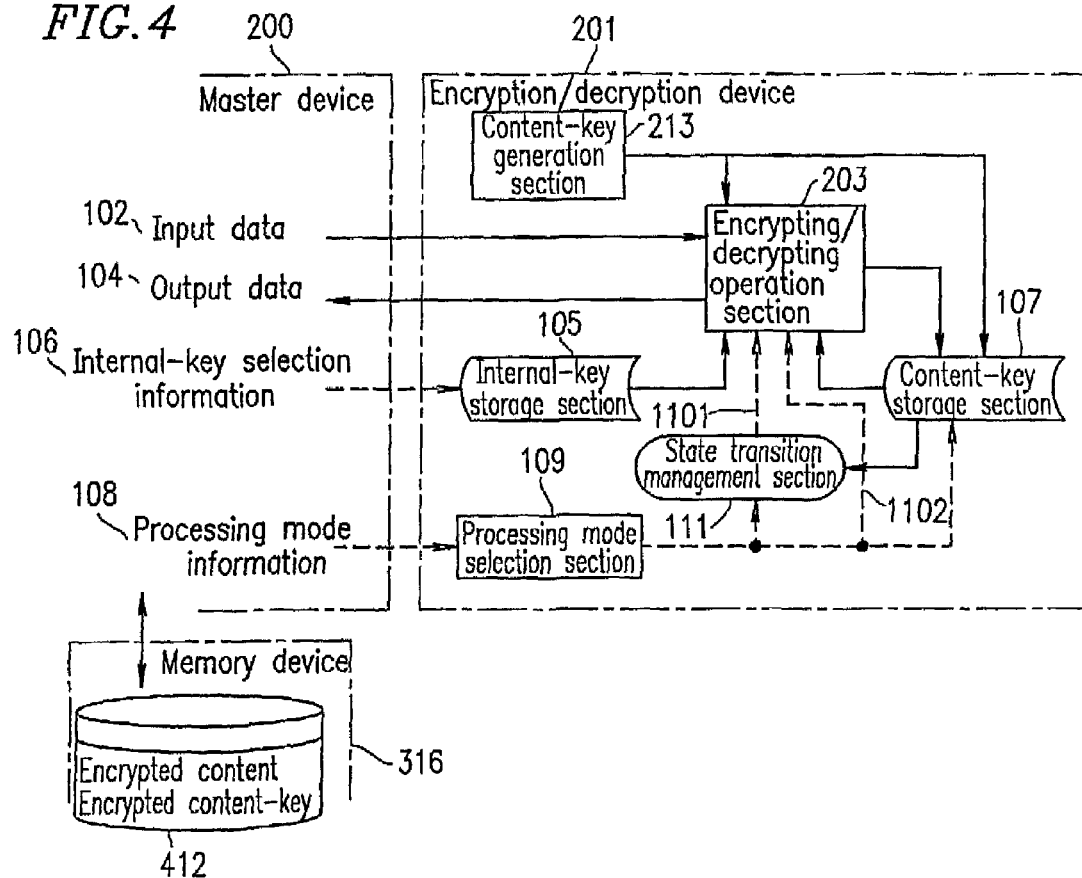
FIG. 4 is a block diagram showing a structure of an encryption/decryption device 201 according to embodiment 2 of the present invention.

FIG. 4 shows a structure of an encryption/decryption device (decryption device) 201 according to embodiment 2 of the present invention. The encryption/decryption device 201 includes an encrypting/decrypting operation section 203 in place of the decrypting operation section 103 of the decryption device 101. Furthermore, the encryption/decryption device 201 includes a content-key generation section 213. In FIG. 4, like elements are indicated by like reference numerals used in FIG. 1, and detailed descriptions thereof are omitted.

The encryption/decryption device 201 is used with a master device 200, and is mounted on a reproduction/recording apparatus (not shown). The master device 200 has a function for reading/writing encrypted contents and encrypted content-keys from/in a predetermined region 412 in a memory device 316.

The encrypting/decrypting device 201 performs four types of processing, i.e., decrypting processing for an encrypted content-key, decrypting processing for an encrypted content, generation processing for generating a content-key, and encrypting processing for encrypting contents. Thus, a processing mode information 108 supplied as a command from the master device 200 to the encryption/decryption device 201 indicates which processing should be performed by the encryption/decryption device 201.

When the processing mode information 108 indicates the decrypting processing for an encrypted content-key, the content-key generation section 213 generates at random a content-key for encrypting contents, and the generated content-key is stored in the content-key storage section 107. For example, the content-key for encrypting contents is generated based on random numbers. The random numbers are generated by generating integers at random using a clock counter, for example.

Figure 5:
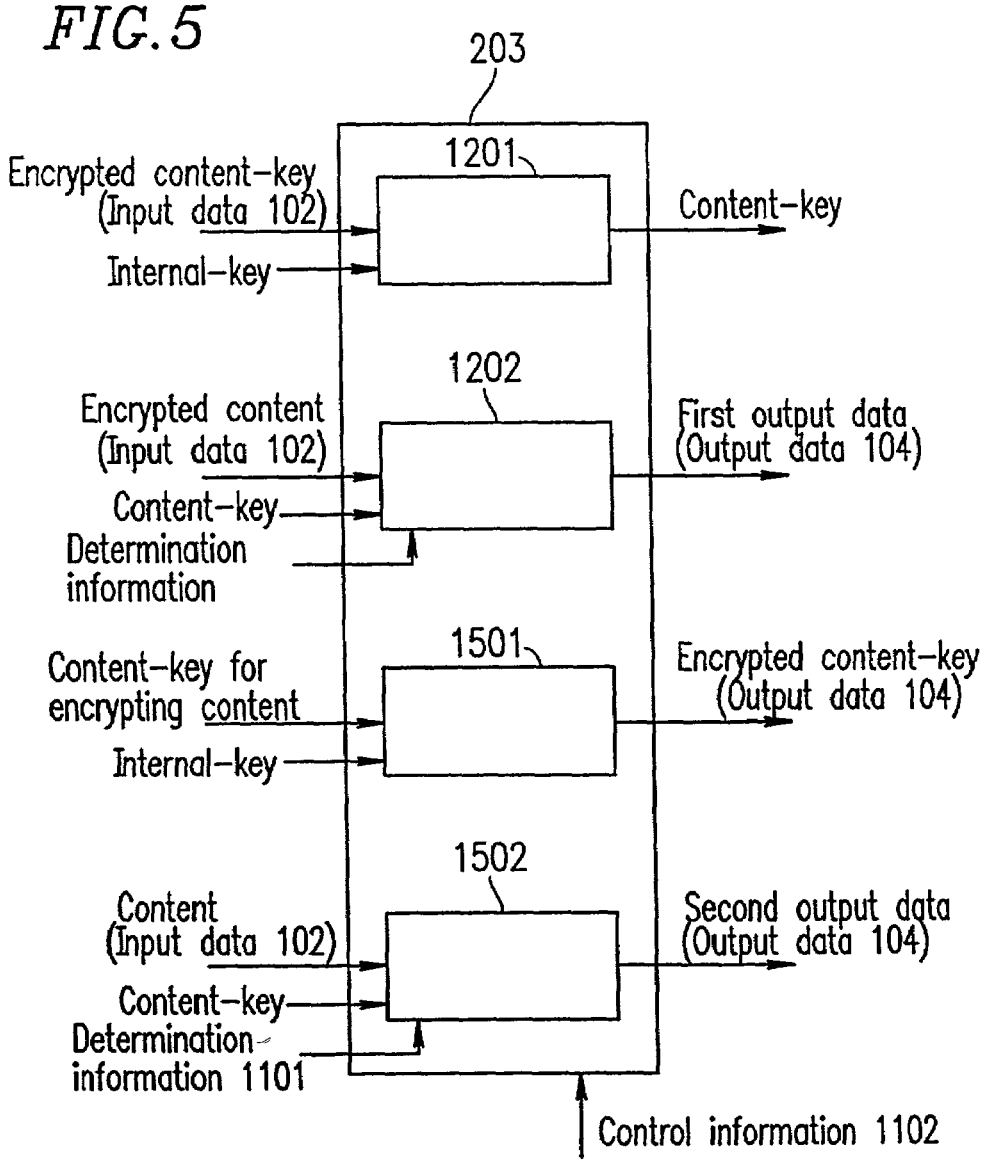
FIG. 5 is a block diagram showing an exemplary internal structure of the encrypting/decrypting operation section 203.

FIG. 5 shows an exemplary internal structure of the encrypting/decrypting operation section 203. The encrypting/decrypting operation section (operation section) 203 includes, in addition to the components of the decrypting operation section 103 shown in FIG. 2, a first encrypting section 1501 for encrypting content-keys and a second encrypting section 1502 for encrypting contents. In FIG. 5, like elements are indicated by like reference numerals used in FIG. 2, and detailed descriptions thereof are omitted.

The first encrypting section 1501 is activated when the processing mode information 108 from the master device 200 (FIG. 4) indicates the encrypting processing for a content-key. When the processing mode information 108 indicates the encrypting processing for a content-key, the content-key generation section 213 (FIG. 4) generates a content-key for encrypting contents based on the random numbers as described above. The first encrypting section 1501 encrypts the content-key for encrypting contents using an internal-key stored in internal-key storage section 105, thereby obtaining an encrypted content-key (second encrypted content-key). This encrypted content-key is output as output data 104 to the master device 200 located outside the encryption/decryption device 201.

The second encrypting section 1502 is activated when the processing mode information 108 from the master device 200 (FIG. 4) indicates the encrypting processing for a content. When the content is input as input data 102 from the master device 200 (FIG. 4) to the second encrypting section 1502, and the determination information 1101 output from the state transition management section 111 indicates that "the value of the content-key storage section 107 in its initial state and a current value of the content-key storage section 107 are different", the second encrypting section 1502 encrypts the content using the value of the content-key storage section 107 as a content-key. The encrypted data (second output data) is output to the master device 200 as output data 104. In this example, the second output data is an encrypted content obtained by encrypting the content.

In this way, the second encrypting section 1502 performs the encrypting processing for a content after it has confirmed that "the value of the content-key storage section 107 in its initial state and a current value of the content-key storage section 107 are different". With such an arrangement, even when the master device 200 is not tamper-resistant, the encrypting processing for a content is prevented from being performed while the content-key storage section 107 is in the initial state. That is, the encrypting processing for a content is prevented from being performed using an initial content-key. Thus, step ② in the above-described typical example of fraudulent acts is prevented from being performed and, accordingly, a decryption device with improved security is achieved.

The encryption/decryption device 201 may be, for example, an ASIC (Application Specified IC). The master device 200 may be, for example, an MPU (Microprocessor Unit). Therefore, the encryption/decryption device 201 may be produced as a single semiconductor package.

Any encryption/decryption algorithm may be employed for encrypting processing performed in the first encrypting section 1501 and the second encrypting section 1502 of the encrypting/decrypting operation section 203. For example, the DES (Data Encryption Standard) may be employed.

The internal structure of the encrypting/decrypting operation section 203 is not limited to the internal structure shown in FIG. 5. The first encrypting section 1501 and the second encrypting section 1502 may have the same structure. Thus, the first encrypting section 1501 and the second encrypting section 1502 may be provided as a single decrypting section.

Embodiment 3

Figure 6:
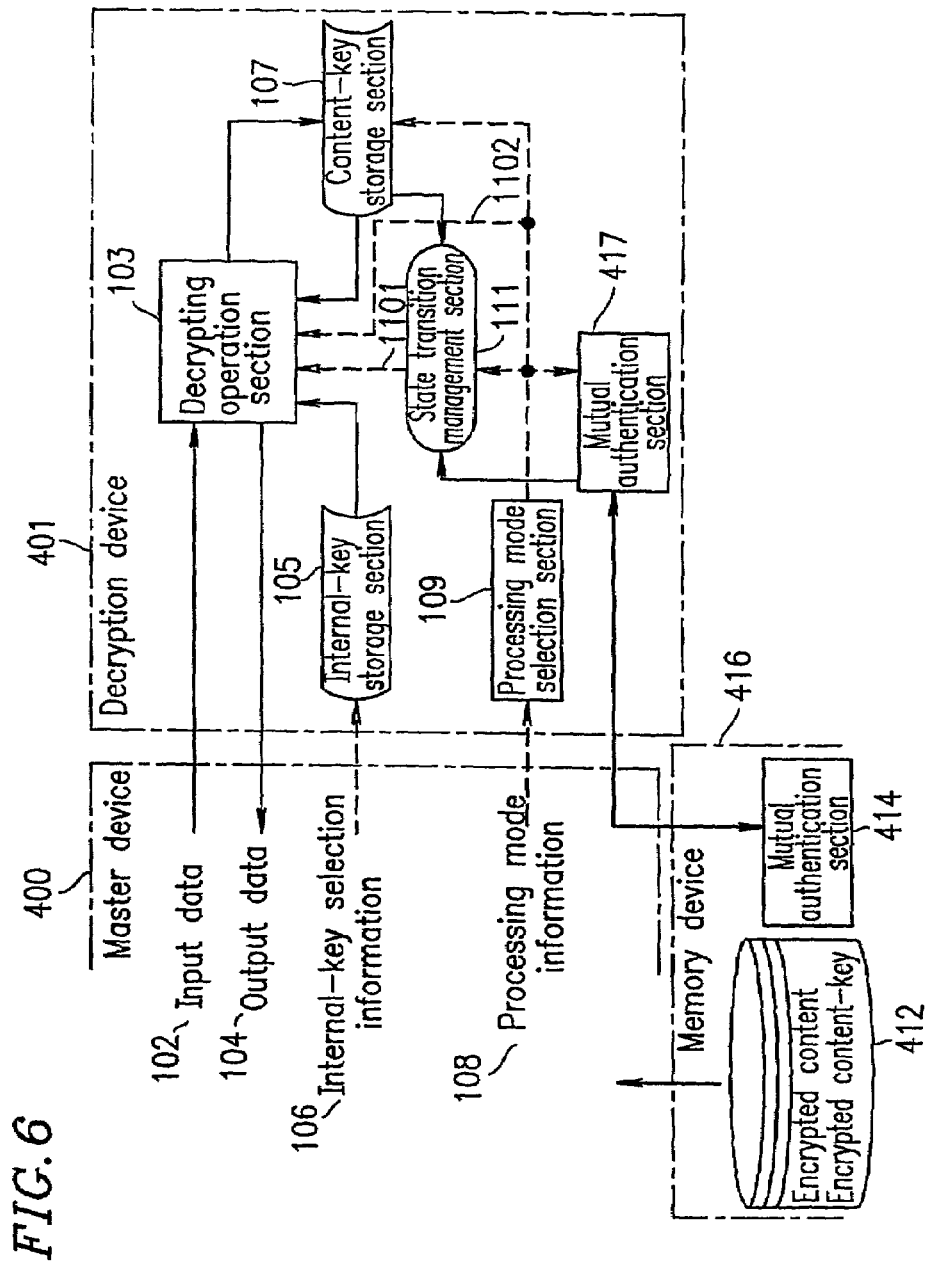
FIG. 6 is a block diagram showing a structure of a decryption device 401 according to embodiment 3 of the present invention.

FIG. 6 shows a structure of a decryption device 401 according to embodiment 3 of the present invention. The decryption device 401 includes a mutual authentication section 417 in addition to the components of the decryption device 101 shown in FIG. 1. In FIG. 6, like elements are indicated by like reference numerals used in FIG. 1, and detailed descriptions thereof are omitted.

The decryption device 401 is used with the master device 400, and is mounted on a reproduction/recording apparatus (not shown). The master device 400 has a function for reading encrypted contents and encrypted content-keys from a predetermined region 412 in a memory device 416.

The memory device 416 may be any recording medium. In the illustrated embodiment, the memory device 416 is a semiconductor storage medium. The memory device 416 has a mutual authentication section 414.

A mutual authentication is made between the mutual authentication section 414 of the memory device 416 and the mutual authentication section 417 of the decryption device 401. Any mutual authentication procedure may be used for the mutual authentication between the mutual authentication sections 414 and 417. A mutual authentication procedure known as a challenge-response system is one example of the mutual authentication procedure used between the mutual authentication sections 414 and 417.

The state transition management section 111 determines whether or not the mutual authentication has been made. When the state transition management section 111 determines that the mutual authentication has been made, the second decrypting section 1202 (FIG. 2) of the decrypting operation section 103 decrypts an encrypted content.

In the example shown in FIG. 6, the state transition management section 111 determines whether or not the mutual authentication has been made. However, according to the present invention, the mutual authentication section 417 may carry out the determination.

In the decryption device 401 according to the present invention, the validity of the memory device 416 storing an encrypted content-key is confirmed. Thus, it is possible to more securely prevent the decrypting processing for contents from being fraudulently operated.

Furthermore, in the decryption device 401 according to the present invention, reading from a "fraudulent medium" (memory device), as in step ③ of the above-described typical example of fraudulent acts, is prevented in a more secure manner. Accordingly, the security of the decryption device 401 is improved.

According to the present invention, the encryption/decryption device 201 shown in FIG. 4 may include the mutual authentication section 417 shown in FIG. 6. In this case, the second encrypting section 1502 (FIG. 5) of the encrypting/decrypting operation section 203 performs encrypting processing for a content when the mutual authentication has been made, whereby the security of the decryption device 201 is improved.

Furthermore, the decryption device (or encryption/decryption device) according to each of embodiments 1-3 may include a content-key verification section which contains a verification pattern and which determines whether a content-key is valid or not.

Figure 7:
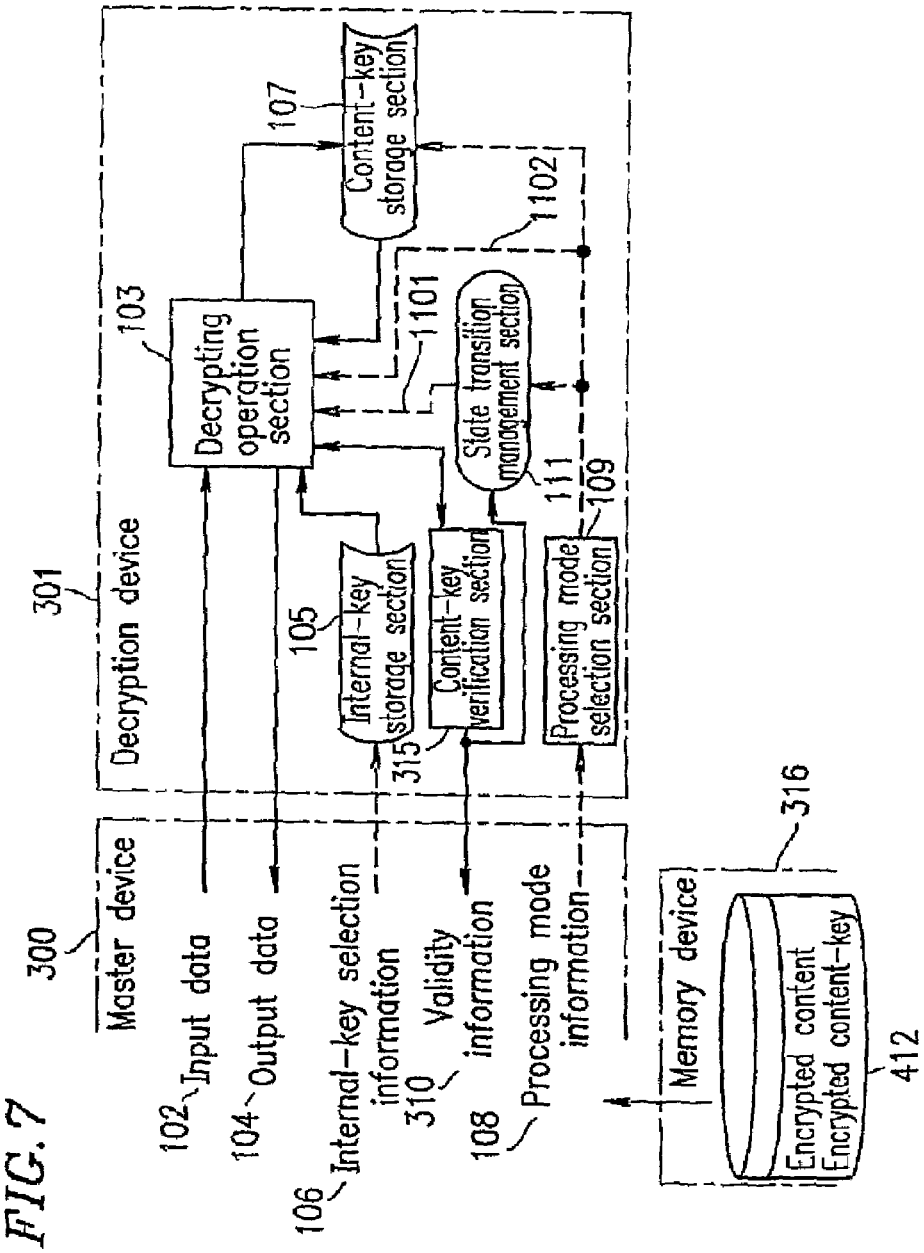
FIG. 7 is a block diagram showing a structure of a decryption device 301 which includes a content-key verification section 315 in addition to the components of the decryption device 101 according to embodiment 1.

FIG. 7 shows a structure of a decryption device 301 including a content-key verification section 315 in addition to the components of the decryption device 101 (FIG. 1) according to embodiment 1.

The decrypting operation section 103 decrypts an encrypted verification pattern using a value of the content-key storage section 107 as a content-key, thereby obtaining a decrypted data. If this decrypted data matches a verification pattern stored in the content-key verification section 315, it is determined that the value of the content-key storage section 107 is a valid content-key.

The second decrypting section 1202 of the decrypting operation section 103 (FIG. 2) performs decrypting processing for contents only when the value of the content-key storage section 107 is a valid content-key. With such an arrangement, an invalid content-key (e.g., an initial content-key) is prevented from being used for decrypting contents.

A decryption device according to the present invention has a determination section for determining whether or not a value of a content-key storage section in its initial state and a current value of the content-key storage section are different. When an encrypted content is input to an operation section, and a value of the content-key storage section in its initial state and the determination section determines that a current value of the content-key storage section are different, a second decrypting section included in the operation section performs decrypting processing for the encrypted content. With such an arrangement, the decrypting processing for the encrypted content is prevented from being performed while the value of the content-key storage section is in the initial state. That is, the decrypting processing for the encrypted content is prevented from being performed using an initial content-key. Thus, the security of the decryption device is improved.

When a decryption device according to the present invention further includes a second encrypting section, the decryption device functions as an encryption/decryption device. When a content is input to an operation section, and a determination section determines that a value of the content-key storage section in its initial state and a current value of the content-key storage section are different, the second encrypting section encrypts the content using the current value of the content-key storage section as a content-key so as to obtain a second output data, and outputs the first output data to outside of the encryption/decryption device. With such an arrangement, the encrypting processing for the content is prevented from being performed while the value of the content-key storage section is in the initial state. That is, the encrypting processing for the content is prevented from being performed using an initial content-key. Thus, the security of the encryption/decryption device is improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A decryption device comprising:
   an internal-key storage section adapted to store an internal-key;
   a content-key storage section adapted to store content-keys;
   a determination section adapted to determine whether or not a value of the content-key storage section in an initial state and a current value of the content-key storage section are different; and
   an operation section, the operation section including:
      a first decrypting section adapted to, when an encrypted content-key is input to the operation section, decrypt the encrypted content-key using the internal-key so as to obtain a content-key and store the content-key in the content-key storage section, and
      a second decrypting section adapted to, when an encrypted content is input to the operation section and the determination section determines that the value of the content-key storage section in the initial state and the current value of the content-key storage section are different, decrypt the encrypted content using the current value of the content-key storage section as the content-key so as to obtain a first output data and output the first output data to outside of the decryption device,
   wherein the determination section comprises a register for storing a value of the content-key storage section at the time that said register receives a Power On Reset (POR) signal, and
   wherein the POR signal is a signal which pulses only once immediately after power-on or immediately after reset, so that the content key storage section is in the initial state immediately after a corresponding power-on or reset of the decryption device.

2. A decryption device according to claim 1, further comprising a mutual authentication section adapted to determine whether or not a mutual authentication has been made between the mutual authentication section and a storage device which is located outside the decryption device, and store the encrypted content-key being stored in the storage device;
   wherein the second decrypting section is adapted to decrypt the encrypted content when the mutual authentication section determines that the mutual authentication has been made.

3. A decryption device according to claim 1, wherein:
   the internal-key storage section is adapted to store a plurality of internal-keys; and
   the internal-key storage section is adapted to select one of the plurality of internal-keys as the internal-key based on internal-key selection information input from outside the decryption device to the decryption device.

4. A decryption device according to claim 1, wherein:
   the second decrypting section is further adapted to prevent decryption of the encrypted content when the determination section determines that the value of the content-key storage section in the initial state and the current value of the content-key storage section are the same.

5. A method for decrypting encrypted content in a decryption device including an internal-key storage section and a content-key storage section, the method comprising:
   storing an internal-key in the internal-key storage section;
   storing content-keys in the content-key storage section;
   determining whether or not a value of the content-key storage section in an initial state and a current value of the content-key storage section are different; and
   decrypting an encrypted content-key provided to the decryption device by using the internal-key so as to obtain a content-key and storing the content-key in the content-key storage section; and
   when it is determined that the value of the content-key storage section in the initial state and the current value of the content-key storage section are different, decrypting the encrypted content using the current value of the content-key storage section as the content-key so as to obtain a first output data and outputting the first output data to outside of the decryption device,
   wherein, for the determination step, a register stores a value of the content-key storage at the time that said register receives a Power On Reset (POR) signal, and
   wherein the POR signal is a signal which pulses only once immediately after power-on or immediately after reset, so that the content key storage section is in the initial state immediately after a corresponding power-on or reset of the decryption device.

6. A method according to claim 5, further comprising:
   storing a plurality of internal-keys in the internal-key storage section; and
   selecting one of the plurality of internal-keys as the internal-key based on internal-key selection information input from outside the decryption device to the decryption device.

7. A method according to claim 5, further comprising:
   preventing decryption of the encrypted content when it is determined that the value of the content-key storage section in the initial state and the current value of the content-key storage section are the same.

* * * * *